(12) United States Patent
Che et al.

(10) Patent No.: US 7,180,692 B1
(45) Date of Patent: Feb. 20, 2007

(54) SYSTEM AND METHOD FOR CALIBRATING AND CONTROLLING A FLY-HEIGHT ACTUATOR IN A MAGNETIC RECORDING DISK DRIVE

(75) Inventors: Xiaodong Che, Saratoga, CA (US); Weidong Huang, San Jose, CA (US); Terence Tin-Lok Lam, Cupertino, CA (US); Zhong-heng Lin, Santa Clara, CA (US); Alex Shteyn, Sunnyvale, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 11/320,425

(22) Filed: Dec. 27, 2005

(51) Int. Cl.
*G11B 27/36* (2006.01)
*G11B 21/02* (2006.01)

(52) U.S. Cl. .......................................... 360/31; 360/75
(58) Field of Classification Search ................ None
See application file for complete search history.

(56) References Cited

U.S. PATENT DOCUMENTS

| | | | |
|---|---|---|---|
| 5,021,906 A | 6/1991 | Chang et al. | |
| 5,130,866 A | 7/1992 | Klaassen et al. | |
| 5,276,573 A | 1/1994 | Harada et al. | |
| 5,455,730 A | 10/1995 | Dovek et al. | |
| 5,991,113 A | 11/1999 | Meyer et al. | |
| 6,344,949 B1 | 2/2002 | Albrecht et al. | |
| 6,407,874 B1 | 6/2002 | Smith et al. | |
| 6,417,981 B1 | 7/2002 | Smith | |
| 6,459,539 B1 | 10/2002 | Carlson et al. | |
| 6,570,730 B1 | 5/2003 | Lewis et al. | |

(Continued)

FOREIGN PATENT DOCUMENTS

JP 2004335069 11/2004

OTHER PUBLICATIONS

Li et al., "Real-Time Method to Measure Head Disk SpacingVariation Under Vibration Conditions", IEEE Trans on Instrumentation and Meas, vol. 52, No. 3, Jun. 2003, pp. 916-920.

(Continued)

*Primary Examiner*—Andrew L. Sniezek
(74) *Attorney, Agent, or Firm*—Thomas R. Berthold

(57) ABSTRACT

A system and method for calibrating and controlling a magnetic recording disk drive fly-height actuator uses the signal from the magnetoresistive (MR) read head to determine head-disk contact (HDC). The MR signal is measured over a low-frequency range, with the slider out-of-contact with the disk, to develop a reference value. The MR signal is then measured over the same low-frequency range and if it exceeds the reference value by some predetermined amount, this is an indication of HDC. The fly-height actuator control signal value for HDC is recorded and thus corresponds to a head-disk spacing of zero. The calibration method also determines the sensitivity of head-disk spacing to the fly-height actuator control signal by measuring a series of MR read signal amplitudes for a corresponding series of control signals. The fly-height actuator is calibrated from the sensitivity and the value of control signal that results in zero head-disk spacing, and can then be controlled to move the head to a desired fly height and maintain it at the desired fly height.

20 Claims, 5 Drawing Sheets

U.S. PATENT DOCUMENTS

| | | |
|---|---|---|
| 6,611,399 B1 | 8/2003 | Mei et al. |
| 6,671,110 B2 | 12/2003 | Baba et al. |
| 6,674,590 B2 | 1/2004 | Ottesen et al. |
| 6,717,776 B2 | 4/2004 | Boutaghou |
| 6,735,027 B2 | 5/2004 | Helsel et al. |
| 6,765,745 B2 | 7/2004 | Smith et al. |
| 6,775,103 B2 | 8/2004 | Kang et al. |
| 6,801,376 B2 | 10/2004 | Smith |
| 6,865,040 B2 | 3/2005 | Fayeulle et al. |
| 2001/0050826 A1 | 12/2001 | Helsel et al. |
| 2003/0067698 A1 | 4/2003 | Dakroub et al. |
| 2003/0156340 A1 | 8/2003 | Jen et al. |
| 2004/0179299 A1 | 9/2004 | Sasaki et al. |
| 2004/0218302 A1 | 11/2004 | Maat |
| 2004/0240099 A1 | 12/2004 | Brannon et al. |
| 2004/0240109 A1 | 12/2004 | Hamann et al. |
| 2005/0013036 A1 | 1/2005 | Yang |
| 2005/0024761 A1 | 2/2005 | Lou et al. |
| 2005/0024775 A1 | 2/2005 | Kurita et al. |
| 2005/0046982 A1 | 3/2005 | Liu et al. |
| 2005/0046985 A1 | 3/2005 | Morinaga et al. |
| 2005/0046988 A1 | 3/2005 | Suk |
| 2005/0046995 A1 | 3/2005 | Lille |
| 2005/0052773 A1 | 3/2005 | Suk |
| 2005/0057841 A1 | 3/2005 | Stuver et al. |
| 2005/0094299 A1 | 5/2005 | Tokizono et al. |
| 2005/0094303 A1 | 5/2005 | Chan |
| 2006/0139789 A1* | 6/2006 | Yang .......................... 360/75 |

OTHER PUBLICATIONS

Tanaka et al., "Slider Dynamics During Continuous Contact with Textured and Smooth Disks in Ultra Low Flying Height", IEEE Trans Magn, vol. 37, No. 2, Mar. 2001, pp. 906-911.

Khurshudov et al., "Head-disk contact detection in the hard-disk drives", Wear 255 (2003) 1314-1322.

Hughes, "Improved Disk Drive Failure Warnings", IEEE Trans Reliability, Sep. 2002, pp. 1-10.

Nikitin, et al. "Spatial and temporal profiling of protrusion in magnetic recording heads", IEEE Transactions on Magnetics, vol. 40, No. 1, Jan. 2004, pp. 326-331.

* cited by examiner

SYSTEM AND METHOD FOR CALIBRATING AND CONTROLLING A FLY-HEIGHT ACTUATOR IN A MAGNETIC RECORDING DISK DRIVE

BACKGROUND OF THE INVENTION

1. Related Application

Concurrently-filed application Ser. No. 11/320,423 relates to a SYSTEM AND METHOD FOR DETERMINING HEAD-DISK CONTACT IN A MAGNETIC RECORDING DISK DRIVE.

2. Field of the Invention

This invention relates to magnetic recording disk drives, and more particularly to disk drives that have a fly-height actuator for controlling the spacing between the read/write head and the disk.

3. Description of the Related Art

Magnetic recording hard disk drives use a read/write transducer or head mounted on a head carrier for reading and/or writing data to the disk. The head carrier is typically an air-bearing slider attached to an actuator arm by a suspension and positioned very close to the disk surface by the suspension. There are typically a stack of disks in the disk drive with a slider-suspension assembly associated with each disk surface in the stack.

The separation or spacing between the head and the disk surface is called the fly height. The slider has a disk-facing air-bearing surface (ABS) that causes the slider to ride on a cushion or bearing of air generated by rotation of the disk. The slider is attached to a flexure on the suspension and the suspension includes a load beam that applies a load force to the slider to counteract the air-bearing force while permitting the slider to "pitch" and "roll". The flying dynamics of the slider and thus the fly height are influenced by factors such as the rotation speed of the disk, the aerodynamic shape of the slider's ABS, the load force applied to the slider by the suspension, and the pitch and roll torques applied to the slider by the suspension.

Disk drives have been proposed that use a fly-height actuator for changing the spacing between the head and the disk surface. One type of fly-height actuator is a thermal actuator with an electrically-resistive heater located on the slider near the head. When current is applied to the heater the heater expands and causes the head to "protrude" and thus move closer to the disk surface. Other fly-height actuators for moving the head relative to the slider include electrostatic microactuators and piezoelectric actuators. Another type of fly-height actuator, also based on thermal, electrostatic or piezoelectric techniques, changes the head-disk spacing by altering the air-flow or the shape of the slider's ABS.

The fly-height actuator must be accurately calibrated so that the head-disk spacing can be controlled. The calibration requires that the value of the control signal that results in onset of head-disk contact (HDC) be known. If the fly-height actuator is a thermal actuator with an electrically-resistive heater located on the slider near the head, this control signal value is the value of heater power that results in HDC.

SUMMARY OF THE INVENTION

The invention is a system and method for calibrating and controlling a magnetic recording disk drive fly-height actuator. The calibration method uses the signal from the magnetoresistive (MR) read head to determine head-disk contact (HDC) and the fly-height actuator control signal that results in HDC. The MR signal is measured over a low-frequency range, with the slider out-of-contact with the disk, to develop a reference value. The MR signal is then measured over the same low-frequency range and this measured value is compared to the reference value. In one aspect of the system and method, the analog MR signal is digitized and input to a digital signal processor with circuitry and/or software for integrating the signal amplitude over a low-frequency range, preferably between about 0.1 and 2 MHz. The calculated value from the integration when the slider is out-of-contact with the disk is the reference value. The same integration is then performed during operation of the disk drive, when the spacing between the head and disk can vary, and the measured value is compared to the reference value. If the measured value exceeds the reference value by some predetermined amount, this is an indication of the onset of HDC or that HDC has occurred. The fly-height actuator control signal value for HDC is recorded and thus corresponds to a head-disk spacing of zero.

The calibration method also determines the sensitivity of head-disk spacing to the fly-height actuator control signal, i.e., the change in spacing for a given change in control signal, by measuring a series of MR read signal amplitudes for a corresponding series of control signals. Changes in the MR read signal amplitudes can be used to determine changes in head-disk spacing using various techniques, including those based on the Wallace spacing loss equation.

The fly-height actuator is then calibrated from the sensitivity and the value of control signal that results in zero head-disk spacing. In one example, if the fly-height actuator is a thermal actuator with a heater located on the slider near the head, the calibration curve is generally a linear function of head-disk spacing to heater power, with the sensitivity being the slope of the line. The fly-height actuator can then be controlled to move the head to a desired fly height and maintain it at the desired fly height.

The method has application in head/disk testers or "spin stands" to facilitate the design and testing of slider-suspension assemblies and fly-height actuators, as well as in disk drives. The invention is also a magnetic recording disk drive that has a fly-height actuator and a digital signal processor with circuitry and/or software that performs the above-described calibration and control.

For a fuller understanding of the nature and advantages of the invention, reference should be made to the following detailed description taken together with the accompanying figures.

DETAILED DESCRIPTION OF THE INVENTION

The invention is applicable to disk drives with head fly-height actuators that move the read-write head relative to the slider or alter the air-flow or shape of the slider's air-bearing surface (ABS) to control the head-disk spacing. The invention is applicable not only to magnetic recording disk drives, but also to head-disk testers or "spin stands" that are used in disk drive manufacturing to design and test the head-disk interface in magnetic recording disk drives.

Figure 1:
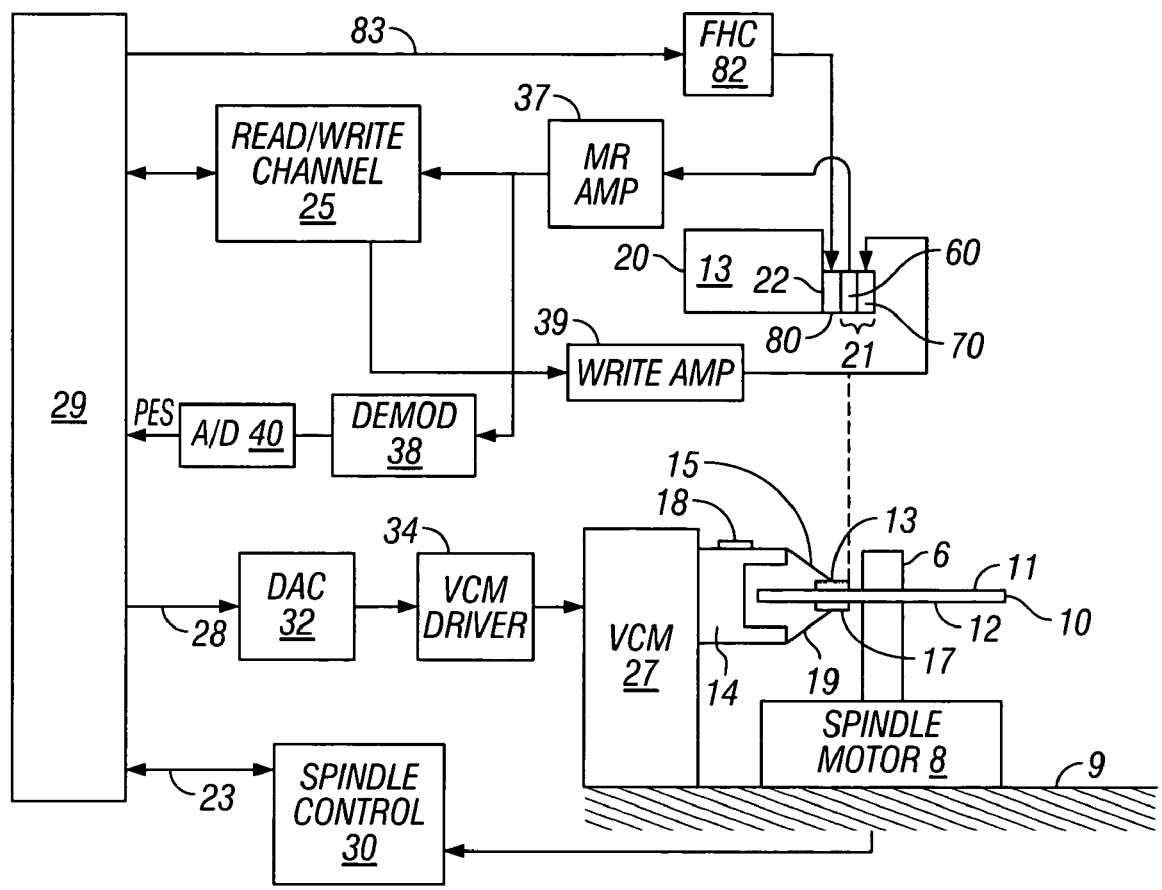
FIG. 1 is a schematic block diagram of a magnetic recording disk drive.

FIG. 1 is a schematic block diagram of a magnetic recording disk drive. The disk drive includes a magnetic recording disk 10 with surfaces 11 and 12, each of which contains a magnetic recording layer. The disk 10 is mounted on a spindle 6 and rotated by a spindle motor 8 about an axis perpendicular to the disk surfaces 11, 12. A head carrier or slider 13 is positioned near the surface 11 of disk 10. Slider 13 is an air-bearing slider having an air-bearing surface (ABS) 20 facing toward the disk surface 11 and a trailing end 22. Slider 13 supports a read/write transducer or head 21 on its trailing end 22 for reading and writing data to the magnetic media on disk surface 11. The head 21 is a dual-element head having an inductive write element or head 70 and a magnetoresistive (MR) read element or head 60. Slider 13 is attached to an actuator arm 14 by means of a suspension 15. The suspension 15 provides a spring force that biases the slider 13 toward the disk surface 11. A second head carrier or slider 17, also supporting a read/write head, is positioned on surface 12 of disk 10 and is attached to actuator arm 14 by means of suspension 19.

Actuator arm 14 is attached to a rotary actuator 27. The actuator is typically a rotary voice coil motor (VCM) that comprises a coil movable within a fixed magnetic field, the direction and velocity of the coil movements being controlled by motor current signals supplied by a hard-disk controller 29. As the disk 10 rotates, the rotary actuator 27 moves the sliders 13, 17 in a generally arcuate path radially in and out over their respective disk surfaces 11, 12 so that the read/write heads may access different portions of the magnetic recording layers where data is desired to be read or recorded. Both the actuator 27 and spindle motor 8 are mounted to a portion of the disk drive housing 9.

Figure 2:
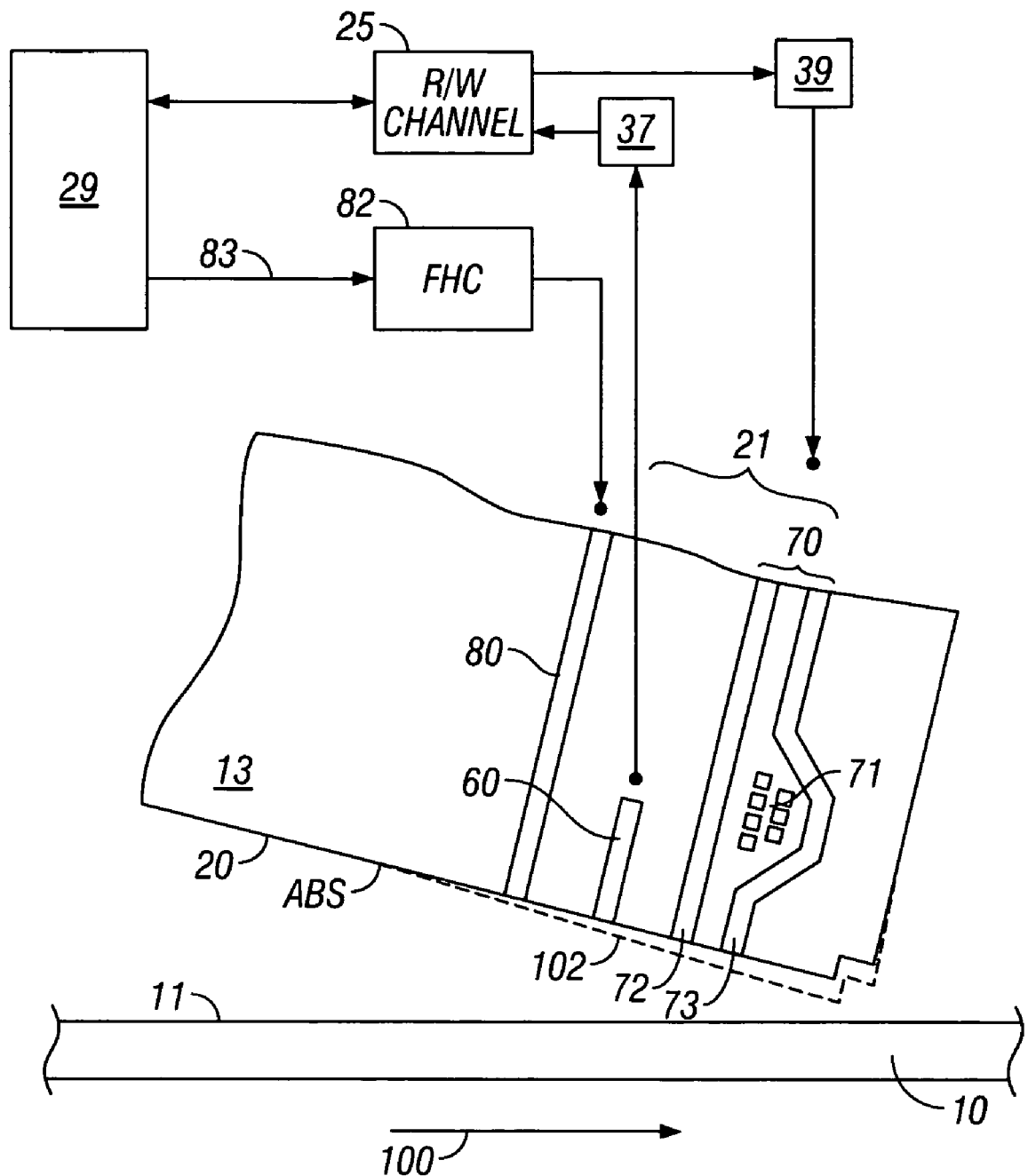
FIG. 2 is a sectional view of the end portion of air-bearing slider above the surface of a disk and illustrates a thermal fly-height actuator, a read head and a write head on the slider.

FIG. 2 is a sectional view of the end portion of slider 13 above the surface 11 of disk 10. The rotation of the disk 10 in the direction of arrow 100 generates an air bearing between the ABS of slider 13 and disk surface 11. During operation of the disk drive, the air bearing counterbalances the slight spring force of the suspension and supports the slider 13 off and slightly away from the disk surface 11 by a small, substantially constant spacing. FIG. 2 also shows the read/write head 21, i.e., a MR read head 60 and write head 70. Write head 70 is an inductive write head with coil 71 located between the two write poles 72, 73.

The slider 13 also includes a fly-height actuator for changing the spacing between read/write head 21 and the disk surface 11. The type of fly-height actuator shown in FIG. 2 is a thermal actuator with an electrically-resistive heating element or heater 80 electrically connected to and controlled by a fly-height controller (FHC) 82. FHC 82 is a power source that controls the amount of current to the heater 80, such as by controlling the settings of a variable resistor. As the current increases, the heater 80 expands and causes protrusion (PTR) of the head 21, as shown by the dashed line 102, which moves the MR read head 60 and pole tips 71, 72 of write head 70 closer to disk surface 11. The FHC 82 may include a temperature feedback control circuit that monitors the temperature of the heater 80 to maintain the fly height of the head within a desired range during operation of the disk drive.

A thermal fly-height actuator is described in U.S. Pat. No. 5,991,113 and published patent application US 2005/0024775 A1. Other fly-height actuators for moving the head relative to the slider include electrostatic microactuators, such as described in U.S. Pat. No. 6,611,399 B1, and piezoelectric actuators, such as described in U.S. Pat. No. 6,570,730 B1. Another type of fly-height actuator changes the head-disk spacing by altering the air-flow or the shape of the slider's ABS. This type of fly-height actuator includes thermal actuators, such as described in U.S. Pat. No. 6,775,103 B2, electrostatic actuators, such as described in U.S. Pat. Nos. 5,276,573 and 6,344,949, and piezoelectric actuators, such as described in U.S. Pat. No. 5,021,906.

Referring again to FIG. 1, the various components of the disk drive are controlled by control signals generated by the controller 29. Controller 29 is a digital signal processor that includes logic control circuits, memory storage, and a microprocessor. Controller 29 generates control signals for the various drive operations, such as control signals on line 23 to spindle motor controller 30, track following and track seek control signals on line 28 for actuator 27, and control signals on line 83 to FHC 82.

Data from disk surface 11 is read by the MR read head 60. The MR signal is amplified by amplifier 37. The amplifier 37 and other read signal processing circuitry, as well as the circuitry for generating the sense or bias current to the MR read head 60, are typically part of an integrated circuit module 18 (FIG. 1) located on actuator arm 14. The module 18 is placed close to the read/write head 21 to keep the interconnections as short as possible, and is thus called the arm electronics module. The output from MR amplifier 37 is sent to the read/write (R/W) channel 25 where the analog signal from the MR read head 60 is processed into digital signals representing data recorded on the magnetic recording layer of disk surface 11. R/W channel 25 typically includes circuitry for automatic gain control, analog to digital conversion, and digital data detection.

Data is written to the magnetic recording layer of disk surface 11 by write signals sent through R/W channel 25 and write amplifier 39 to inductive write head 70. Write amplifier 39 is typically located in arm electronics module 18.

The track following and seek control signals on line 28 are generated by controller 29 that runs a servo control algorithm in response to input head position error signals (PES). The MR read head 60 reads head position servo information recorded on the disk, typically at equally angularly spaced servo sectors embedded between the data sectors. This analog servo output from MR amplifier 37 is demodulated by demodulator 38 and converted to a digital position error signal (PES) by analog-to-digital (A/D) converter 40. The track following and seek control signals on line 28 are sent to digital-to-analog converter (DAC) 32 that converts them to analog voltage signals which are output to VCM driver 34. VCM driver 34 then sends corresponding current pulses to the coil of VCM actuator 27 to pivot the arm 14 radially inward and outward to move and position the sliders 13, 17 to the desired data tracks on the respective disk surfaces 11, 12.

The invention is a system and method for calibrating and controlling the fly-height actuator so that a desired head-disk spacing, primarily the spacing between the write pole tips 72, 73 and the surface 11 of disk 10, can be selected and maintained. The method includes determining (a) the signal from FHC 82 (and thus also the control signal on line 83 to FHC 82) that results in head-disk contact (HDC), and (b) the sensitivity of head-disk spacing to the fly-height control signal, i.e., the change in spacing for a given change in signal from FHC 82. The head-disk spacing can thus be controlled to and maintained at a desired fly-height by controller 29 that signals FHC 82 to generate the appropriate level of heater power to heater 80.

Determining HDC and the Fly-Height Control Signal HDC Value

The term "head-disk contact" or HDC means that some portion of the slider, such as the read head 60, the write head 70, or the trailing end 22, is in contact with the disk surface 11. The term "determining" HDC means detecting the onset of HDC or concluding that HDC has occurred or is imminent.

A low-frequency oscillation of the MR signal has been observed at the onset of HDC and during HDC. This signal is called the HDC oscillation signal because it is caused entirely by the effect of HDC. The first harmonic frequency of HDC oscillation was found to be very close to the slider pitch mode resonant frequency. The signal is not sensitive to many other factors, like radial position of the head on the disk, disk RPM and the type of disk (metal or glass substrate). Thus, the HDC oscillation signal is relatively easy to detect for different disk drives and different slider-suspension assemblies.

Figure 3A:
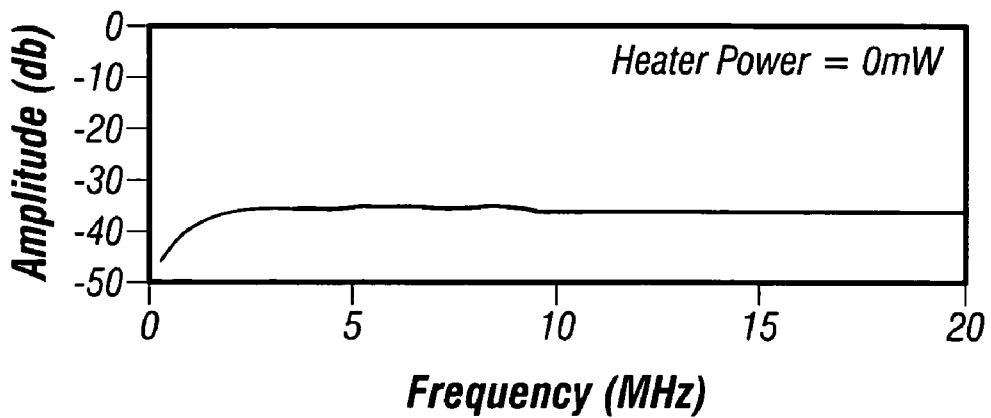
FIGS. 3A–3C show the read signal amplitude as a function of frequency for three increasing levels of power applied to the thermal fly-height actuator.
Figure 3B:
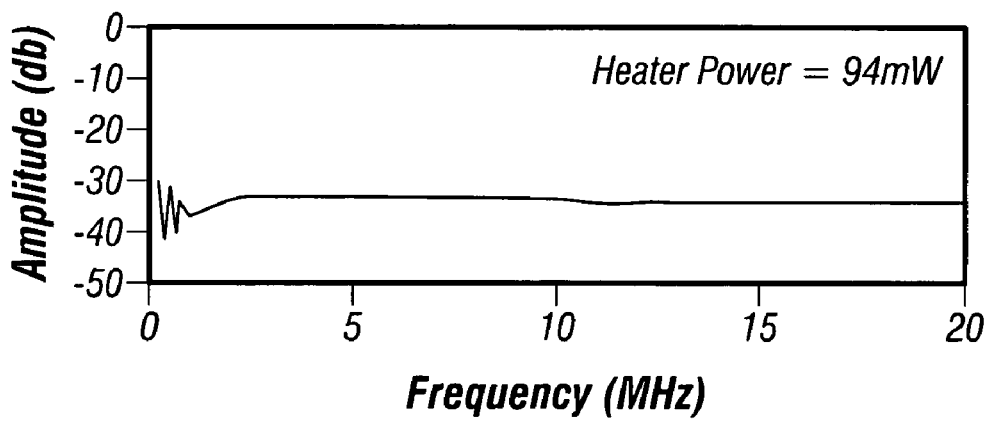
Figure 3C:
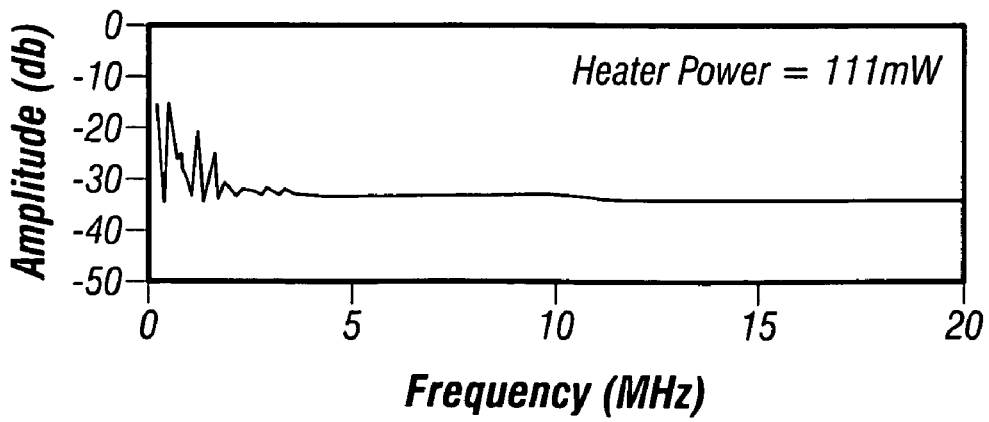
Figure 4:
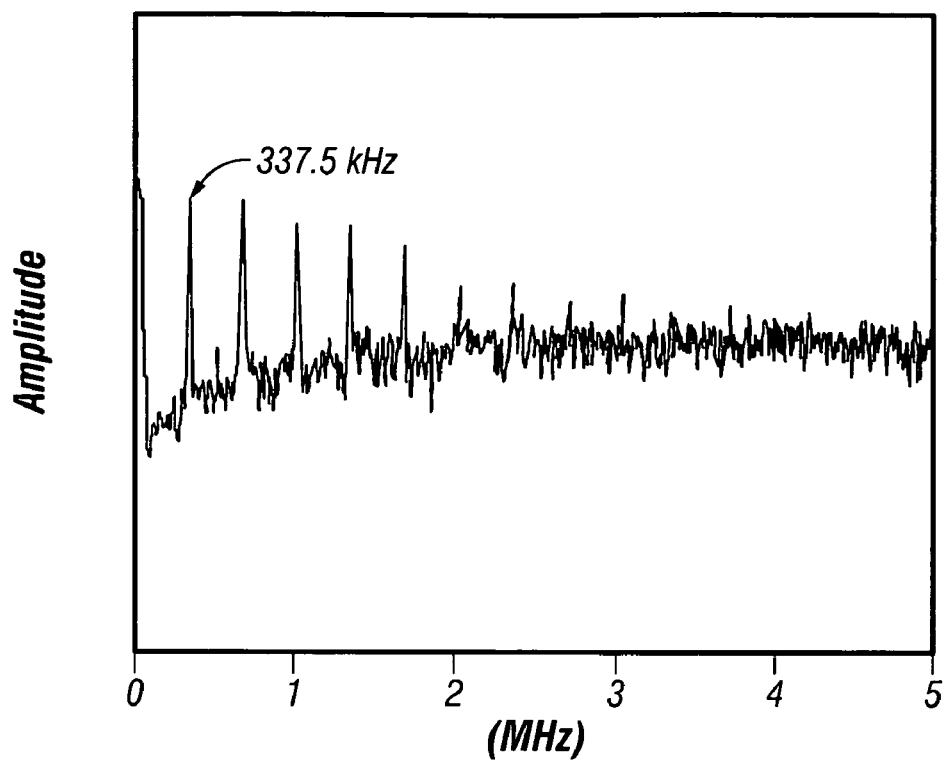
FIG. 4 is a Fourier transform of the head-disk contact (HDC) oscillation signal at low frequency for a specified power applied to the thermal fly-height actuator.

HDC oscillation was measured in a disk drive with a thermal fly-height actuator for various levels of heater power (Hp). FIGS. 3A–3C show the MR signal amplitude as a function of frequency for three different levels of heater power. In FIG. 3A no power is applied to the heater and thus the head is not in contact with the disk, with the fly height being determined essentially by the air-bearing between the slider and the rotating disk. In FIG. 3B the applied heater power is 94 mW and there is an onset of HDC, as shown by the signal amplitude below 1 MHz. In FIG. 3C, the applied heater power is 111 mW and HDC has occurred. FIG. 4 shows the Fourier transform component of the HDC oscillation signal below about 2 MHz for an applied heater power of 120 mW, with the first harmonic frequency being at about 337.5 kHz. For this particular slider-suspension assembly the slider resonant frequency for the pitch mode was about 284 kHz.

Figure 5:
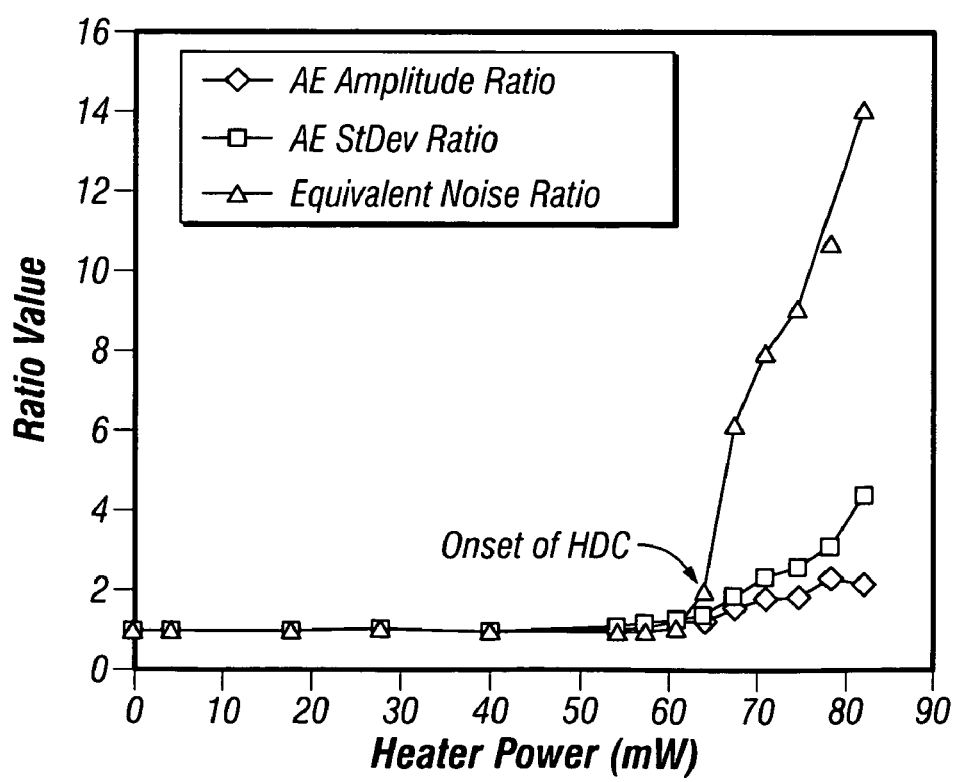
FIG. 5 shows three parameters (integrated equivalent noise ratio due to HDC, output amplitude ratio of a conventional acoustic-emission sensor, and the acoustic-emission standard deviation ratio) vs. heater power for a particular slider-suspension assembly.

Because the HDC oscillation occurs at relatively low frequency, the integrated power spectrum (also called the integrated "spectral density" in digital signal processing technology) can be used to determine HDC. FIG. 5 shows three parameters (integrated equivalent noise ratio due to HDC, output amplitude ratio of a conventional acoustic-emission sensor, and the acoustic-emission standard deviation ratio) vs. heater power for a particular slider-suspension assembly. The integrated equivalent noise ratio is a ratio of integrated equivalent noise with heater power tested to that with zero power, i.e., the ratio of measured integrated spectral density to the integrated spectral density reference value. The frequency range of interest is from about 0.1 to 2 MHz, depending on the mechanical property of the HGA (the "head-gimbal-assembly", a system including the suspension and slider with the read/write head). For the data of equivalent noise ratio shown in FIG. 5, the frequency range was selected from 0.3 to 1.0 MHz to sufficiently cover the mechanical resonance vibration frequencies of the HGAs being tested. In this frequency range the output of the MR head is almost entirely noise so the integrated power spectrum can also be considered as integrated equivalent noise. If there is no HDC, the MR signal is normal low-frequency noise of the recording system and the integrated spectral density, i.e., the integration of the signal amplitude over the frequency range of interest, will be very low. This value can be used as a reference value. When the head starts to contact the disk as heater power is increased, the measured value of integrated spectral density will increase and will continue to increase with increasing heater power. When the heater power is greater than the power at which the onset of HDC occurs, the measured value will increase dramatically with increasing heater power. Thus, from the turning point of the curve for integrated equivalent noise vs. heater power, the onset of HDC can be determined and correlated with the corresponding heater power. The data shown in FIGS. 3–5 were from a MR signal from a giant magnetoresistive (GMR) read head. However, if a tunneling magnetoresistive (TMR) read head were to be used instead of a GMR head, it may be desirable to measure the first harmonic of the HDC oscillation signal rather than the integrated equivalent noise because the HDC oscillation signal for TMR head is relatively small.

In FIG. 5, the onset of HDC occurs at a heater power of about 64 mW, which corresponds to an integrated equivalent noise ratio of approximately 1.9. To verify this as the correct onset point for HDC, an acoustic-emission (AE) sensor was mounted on the arm supporting the slider-suspension assembly, and the AE sensor amplitude ratio and its standard deviation (StDev) ratio were measured and plotted in FIG. 5. The AE amplitude ratio and StDev ratio in FIG. 5 are the ratios of AE sensor amplitude and StDev with heater power tested to AE sensor amplitude and StDev, respectively, at zero heater power. Good correlation between integrated equivalent noise ratio and AE amplitude ratio and StDev ratio shows not only that the method of determining HDC using the HDC oscillation signal is very effective, but also that it is an earlier indicator of HDC onset. As shown in FIG. 5, the integrated equivalent noise ratio due to HDC oscillation increases much faster than the other two parameters. This shows that using the HDC oscillation signal to determine HDC is more effective than using an AE sensor.

The integrated equivalent noise ratio at onset of HDC can be determined experimentally for the particular slider-suspension assembly under study. Since the ratio rises rapidly, as shown in FIG. 5, a lower or higher ratio can be selected as the threshold ratio to determine HDC, depending on the action to be taken when HDC is determined. For example, in FIG. 5 it appears that the change in the ratio curve occurs when the integrated equivalent noise is about 90% greater than the integrated equivalent noise for zero heater power (a ratio of 1.9). However, if it is desired to minimize HDC, then for example a threshold ratio of 1.3 can be selected as a safety margin. Similarly, if it is desired that HDC be absolutely established, then for example a threshold ratio of 6.0 can be selected.

Thus the value of Hp for HDC is known. For the HGA used in FIG. 5, a heater power of 64 mW resulted in HDC and is the value corresponding to zero head-disk spacing. Thus the control signal from FHC 82 that results in a power of 64 mW at heater 80 is the fly-height actuator control signal value that corresponds to zero head-disk spacing. This control signal value for zero-spacing or HDC, together with the sensitivity of head-disk spacing to fly-height control signal as described below, is used in the method for calibrating the fly-height actuator.

Determining Sensitivity of Head-Disk Spacing to Fly-Height Control Signal

Changes in head-disk spacing in a disk drive can be determined from changes in the read signal. Various techniques are available and are generally based on the well-known Wallace spacing loss relationship:

$$d_0 - d(t) = (B/\pi)\ln[A(t)/A_0] + (B/\pi)\ln[C(t)/C_0], \quad \text{Equation (1)}$$

where a single-frequency reference pattern with wavelength $\lambda$ and length of bit cell $B = \lambda/2$ is written on the disk and $A_0$ is the amplitude of the read-back signal for the reference pattern at the reference magnetic spacing $d_0$, and $d(t)$ is the magnetic spacing for a read head that detects an amplitude $A(t)$ of the single-frequency reference pattern. C is a constant that depends on reader sensitivity and temperature. $C(t)$ and $C_0$ are two values of C which correspond to $d(t)$ and $d_0$, respectively.

To determine how a change in heater power (Hp) affects a change in head-disk spacing, the following steps are performed by the head/disk tester or the disk drive:

1. Erase the data track to be used as the reference track.
2. Set Hp to zero.
3. Write a reference signal with a length of bit cell B1, and measure $A_0$ from the read-back signal.
4. Set Hp to the first non-zero value, $Hp_1$, then measure $A_1$. Repeat for all Hp values from 1 to m.
5. Calculate $d_{1k} = (B/\pi)\ln[A_k/A_0]$ for k=1 to m. This results in a set of corresponding $Hp_k$ and $d_{1k}$ values (k=1 to m) for length of bit cell $B_1$.
6. Repeat steps 3 through 5 for a $B_2$, and again for a $B_3$. (By way of example, $B_2$ may be twice $B_1$ and $B_3$ may be three times $B_1$). This results in three sets of corresponding $d_{jk}$ values (k=1 to m) for length of bit cells $B_j = B_1, B_2, B_3$ (The value of j should be equal or large than 3).
7. For a fixed value of k, perform a linear fitting for the three data points, $d_{jk}$ where j=1, 2, and 3 (corresponding to the $B_1$, $B_2$ and $B_3$ patterns) in the plot of $d_{jk}$ vs. frequency $B_j$. From the curve fit, calculate $d_k$ that corresponds to B=0 ($d_k = d_{jk|B\to 0}$) and this is the read-head protrusion for the $k^{th}$ value of $Hp_k$.
8. Repeat step 7 for each value of k.

This results in a set of values $Hp_k$, $d_k$ that can be plotted or fit to a linear curve fit. The slope of this line is the sensitivity ($\rho$) of head-disk spacing to heater power (Hp) expressed as follows:

$$\rho = \Delta d / \Delta Hp \quad \text{Equation (2)}$$

Other techniques for determining $\rho$ from the read-back signal include the pulse-width method and the harmonic ratio fly-height (HRF) method. The pulse-width method relies on changes in pulse width at 50% amplitude (PW50) with changes in magnetic spacing. The pulse-width method, and the above-described method based on Equation (1), are described in detail by Nikitin, et al. "Spatial and temporal profiling of protrusion in magnetic recording heads", *IEEE Transactions on Magnetics*, Vol. 40, No. 1, January 2004, pp. 326–331. The HRF method calculates the ratio of the fundamental amplitude to the third harmonic amplitude of the read-back signal, and is described in detail in U.S. Pat. No. 5,130,866.

Figure 6:
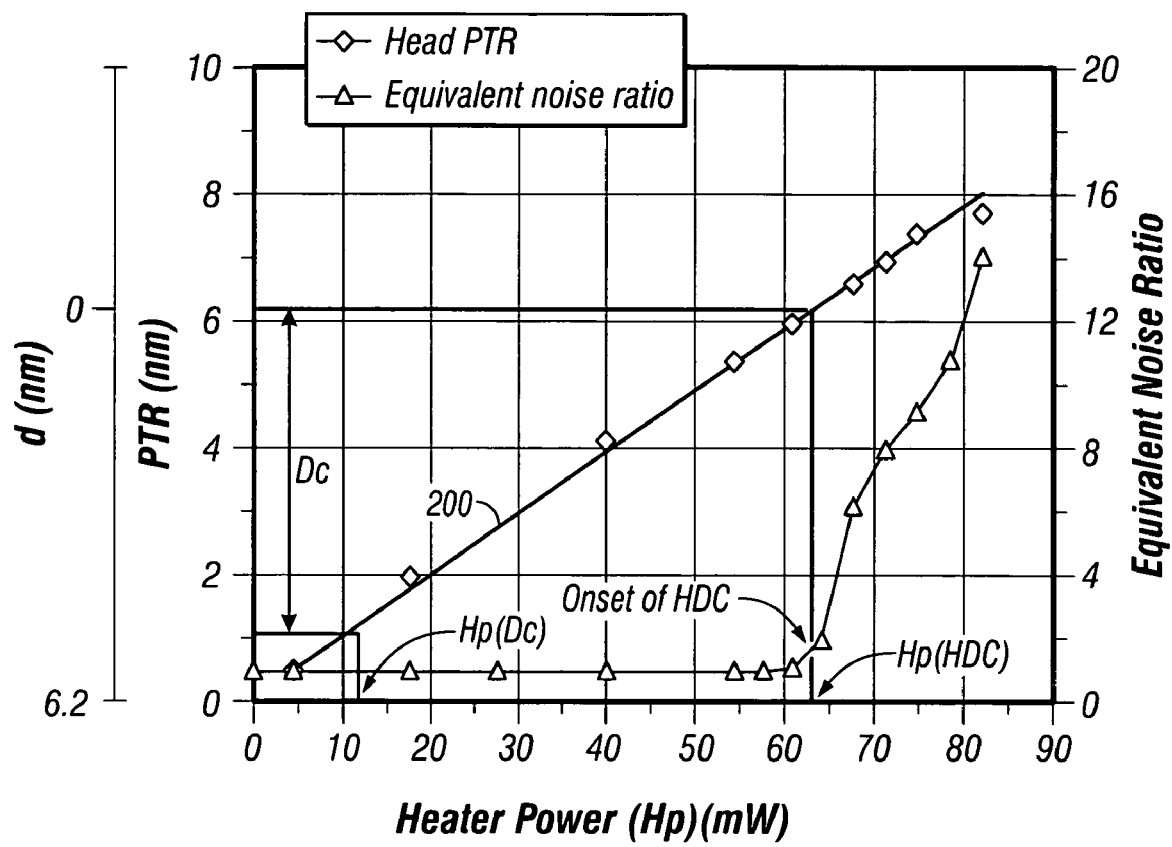
FIG. 6 is a calibration curve showing the generally linear relationship between head-disk spacing and heater power, and illustrates the method of controlling the head-disk spacing to a desired spacing.

With the known value of $\rho$ and the previously determined value of Hp that results in HDC it is possible to calibrate the fly-height actuator. This is illustrated in FIG. 6, which shows the linear relationship of both head protrusion (PTR) and head-disk spacing (d) as a function of heater power (Hp) for the same HGA as in FIG. 5. Line 200 is the calibration curve with its origin (0, 0) corresponding to zero PTR at zero Hp. The slope of line 200 is the sensitivity $\rho$. Thus the spacing d is given as follows:

$$d = (\rho)[Hp(HDC) - Hp(d)] \quad \text{Equation (3)}$$

From the previous determination of HDC for the HGA described by FIG. 5, the value of Hp(HDC)=64 mW intersects line 200 at a point that corresponds to a PTR of about 6.2 nm, which corresponds to zero spacing (d=0). In this example $\rho = 0.0976$ nm/mW, so that the relationship in this example is as follows:

$$d = (0.0976)[64 - Hp(d)] \quad \text{Equation (4), or}$$

$$Hp(d) = [64 - (10.246 * d)] \quad \text{Equation (5)}$$

FIG. 6 shows an example where it is desired to maintain the fly height at a disk spacing Dc of 5 nm. This corresponds to Hp=12.78 mW. Thus the values of the control signal from FHC 82 (and the corresponding control signal from controller 29 on line 83 to FHC 82) are selected to cause the power at heater 80 to be 12.78 mW.

The data shown in FIGS. 3–6 was accumulated using a head/disk tester or spin stand, such as the Guzik Model V2002(X-Y)/RWA2002 or 2004 from Guzik Technical Enterprises, with the MR signal being input to either an internal spectrum analyzer on the Guzik spin stand or an external commercially available spectrum analyzer or digital oscilloscope. Digital oscilloscopes and digital disk drive analyzers, such as those available from LeCroy Corporation, digitize the MR signal by an analog-to-digital converter (ADC) to create a data set that is stored in the memory of a microprocessor. The data set is processed and sent to the display. In addition, complex processing of the digital signal can be performed by high-speed digital signal processing circuits. The oscilloscope or analyzer includes programmable signal analysis software that can extract many useful time-domain features (e.g., rise time, pulse width, amplitude), frequency spectra, and other parameters, and is thus able to calculate the integrated spectral density of the MR signal, as well as the amplitudes required to perform the head-disk spacing calculations.

However, the above-described method of determining the heater power corresponding to HDC, and the method for determining sensitivity using the MR read signal, can also be implemented in a disk drive. Referring again to FIG. 2, the MR signal from MR amplifier 37 is digitized in R/W channel 25 (or in a separate analog-digital-converter) and then input to controller 29. The same digital signal processing techniques and data analysis performed by the digital oscilloscope or disk drive analyzer can be programmed into controller 29. Thus controller 29 analyzes the digitized MR signal and runs the program to calculate the integrated reference value and the integrated measured value. When the integrated equivalent noise ratio exceeds a predetermined threshold, thus indicating or signaling the onset of HDC, the controller 29 records the corresponding value of the control signal on line 83 to FHC 82. The controller also extracts the MR signal amplitudes from the digitized MR signal to perform the head-disk spacing calculations and the resulting calculation of sensitivity.

While the invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A method for calibrating a fly-height actuator in a magnetic recording disk drive having a rotatable magnetic recording disk, an air-bearing slider maintained near the surface of the rotating disk, a read/write head on the slider, a digitizer for digitizing the signal from the read head, a head fly-height actuator for changing the head-disk spacing, and a fly-height controller connected to the fly-height actuator, the method comprising:

determining the fly-height control signal head-disk contact (HDC) value, comprising (a) integrating the amplitude of the digitized read-head signal over a predetermined frequency range when the slider is out of contact with the surface of the rotating disk to determine a reference value; (b) applying a control signal to the fly-height actuator to reduce the head-disk spacing; (c) integrating the amplitude of the digitized read-head signal over said predetermined frequency range as a measured value as the head-disk spacing is reduced; and (d) when said measured value is greater than said reference value by a predetermined amount, recording the fly-height actuator control signal as said HDC value;

measuring, for a series of fly-height control signal values, a corresponding series of digitized read-head signal amplitudes;

calculating head-disk spacing from said measured read-signal amplitudes; and correlating changes in head-disk spacing with changes in fly-height actuator control signal value.

2. The method of claim 1 wherein said predetermined frequency range is between about 0.1 and 2 MHz.

3. The method of claim 1 wherein the head fly-height actuator is located on the slider and is one of a thermal actuator, an electrostatic actuator and a piezoelectric actuator.

4. The method of claim 1 wherein correlating changes in head-disk spacing with changes in fly-height actuator control signal value comprises:

calculating a generally linear function of head-disk spacing to fly-height actuator control signal value, the slope of said linear function being the change in head-disk spacing with change in fly-height actuator control signal value.

5. The method of claim 4 wherein said linear function is represented generally by the following relationship:

$$d=(\rho)[Hp(HDC)-Hp(d)],$$

where d is the head-disk spacing, $\rho$ is the slope of the linear function, Hp(HDC) is the fly-height control signal HDC value, and Hp(d) is the fly-height control signal value corresponding to a head-disk spacing of d.

6. The method of claim 5 wherein the head fly-height actuator is a thermal actuator comprising a heater located on the slider near the head and wherein Hp is heater power.

7. The method of claim 5 further comprising, after calculating said generally linear function, controlling the fly-height actuator by applying a control signal value of Hp(Dc) to maintain the head-disk spacing substantially at a desired value Dc.

8. A method for controlling the head-disk spacing in a magnetic recording disk drive having a rotatable magnetic recording disk, an air-bearing slider maintained near the surface of the rotating disk, a read/write head on the slider, a digitizer for digitizing the signal from the read head, a head fly-height actuator for changing the head-disk spacing, and a fly-height controller connected to the fly-height actuator, the method comprising:

determining the fly-height control signal head-disk contact (HDC) value, comprising (a) integrating the amplitude of the digitized read-head signal over a predetermined frequency range when the slider is out of contact with the surface of the rotating disk to determine a reference value; (b) applying a control signal to the fly-height actuator to reduce the head-disk spacing; (c) integrating the amplitude of the digitized read-head signal over said predetermined frequency range as a measured value as the head-disk spacing is reduced; and (d) when said measured value is greater than said reference value by a predetermined amount, recording the fly-height actuator control signal as said HDC value;

determining the sensitivity of head-disk spacing to fly-height control signal value, comprising measuring a series of digitized read-head signal amplitudes for corresponding fly-height control signal values; and thereafter controlling the head-disk spacing to a desired spacing by use of the previously determined HDC value and sensitivity.

9. The method of claim 8 wherein said predetermined frequency range is between about 0.1 and 2 MHz.

10. The method of claim 8 wherein the head fly-height actuator is located on the slider and is one of a thermal actuator, an electrostatic actuator and a piezoelectric actuator.

11. The method of claim 8 wherein the head fly-height actuator is a thermal actuator comprising a heater located on the slider near the head and wherein the fly-height control signal is heater power (Hp).

12. The method of claim 11 further comprising calculating, from the measured series of digitized read-head signal amplitudes and corresponding fly-height control signal values, a generally linear function of head-disk spacing to Hp, the slope of said linear function being said sensitivity of head-disk spacing to Hp, said linear function being represented generally by the relationship:

$$d=(\rho)[Hp(HDC)-Hp(d)],$$

where d is the head-disk spacing, p is the slope of the linear function, Hp(HDC) is the fly-height control signal HDC value, and Hp(d) is the fly-height control signal value corresponding to a head-disk spacing of d.

13. A system for calibrating a magnetic recording disk drive fly-height actuator comprising:

a rotatable magnetic recording disk;

an air-bearing slider maintained near the surface of the disk when the disk is rotating;

a read/write head on the slider;

a fly-height actuator for changing the spacing between the read/write head and the disk surface;

an analog-to-digital converter for digitizing the signal from the read head;

a digital signal processor for processing the digitized signal from the read head and for sending control signals to the fly-height actuator; and a program of instructions readable by the processor for undertaking method acts comprising (a) determining the fly-height control signal head-disk contact (HDC) value by (i) integrating the amplitude of the digitized signal over a predetermined frequency range when the slider is out of contact with the surface of the rotating disk, (ii) recording said integrated out-of-contact signal as a reference value, thereafter (iii) integrating the amplitude of the digitized signal over said predetermined frequency range as a measured value, and (iv) when said measured value is greater than said reference value by a predetermined amount, recording the fly-height actuator control signal as said HDC value; and (b) determining the sensitivity of head-disk spacing to fly-height control signal value by (i) measuring, for a series of fly-height control signal values, a corresponding series of digitized read-head signal amplitudes, (ii) calculating head-disk spacing from said measured read-signal amplitudes, and (iii) correlating changes in head-disk spacing with changes in fly-height actuator control signal value.

14. The system of claim 13 wherein the method act of correlating changes in head-disk spacing with changes in fly-height actuator control signal value comprises:

calculating a generally linear function of head-disk spacing to fly-height actuator control signal value, the slope of said linear function being the change in head-disk spacing with change in fly-height actuator control signal value.

15. The system of claim 14 wherein the method act of calculating a generally linear function comprises calculating a linear function represented generally by the following relationship:

$$d = (\rho)[Hp(HDC) - Hp(d)],$$

where d is the head-disk spacing, p is the slope of the linear function, Hp(HDC) is the fly-height control signal HDC value, and Hp(d) is the fly-height control signal value corresponding to a head-disk spacing of d.

16. The system of claim 15 wherein the head fly-height actuator is a thermal actuator comprising a heater located on the slider near the head and wherein Hp is heater power.

17. The system of claim 15 wherein said program of instructions readable by the processor includes the method act of controlling the fly-height actuator by applying a control signal value of Hp(Dc) to maintain the head-disk spacing substantially at a desired value Dc.

18. The system of claim 13 wherein the fly-height actuator is one of a thermal actuator, an electrostatic actuator and a piezoelectric actuator.

19. The system of claim 13 wherein the system is a head/disk tester.

20. The system of claim 13 wherein the system is a magnetic recording disk drive.

* * * * *